(12) United States Patent
Davidson et al.

(10) Patent No.: US 12,100,960 B2
(45) Date of Patent: Sep. 24, 2024

(54) ELECTRICAL ASSEMBLY FOR POWER TRANSMISSION AND COMPENSATION

(71) Applicant: General Electric Technology GmbH, Baden (CH)

(72) Inventors: Colin Charnock Davidson, Stafford (GB); Andrew Nolan, Stafford (GB); Alistair John Burnett, Stafford (GB)

(73) Assignee: GE Infrastructure Technology LLC, Greenville, SC (US)

( * ) Notice: Subject to any disclaimer, the term of this patent is extended or adjusted under 35 U.S.C. 154(b) by 342 days.

(21) Appl. No.: 17/430,271

(22) PCT Filed: Feb. 5, 2020

(86) PCT No.: PCT/EP2020/052812
§ 371 (c)(1),
(2) Date: Aug. 11, 2021

(87) PCT Pub. No.: WO2020/164982
PCT Pub. Date: Aug. 20, 2020

(65) Prior Publication Data
US 2022/0131365 A1    Apr. 28, 2022

(30) Foreign Application Priority Data
Feb. 12, 2019   (EP) ..................................... 19156698

(51) Int. Cl.
*H02M 1/32*     (2007.01)
*H02H 1/00*     (2006.01)
(Continued)

(52) U.S. Cl.
CPC ............. *H02J 3/36* (2013.01); *H02H 1/0015* (2013.01); *H02H 7/10* (2013.01); *H02M 1/32* (2013.01);
(Continued)

(58) Field of Classification Search
CPC .......... H02M 5/40; H02M 5/42; H02M 5/453; H02M 7/7575; H02M 5/458; H02M 5/45;
(Continued)

(56) References Cited

U.S. PATENT DOCUMENTS

| 8,390,968 | B2 * | 3/2013 | Dorn | H02M 1/32 |
| | | | | 361/111 |
| 9,712,042 | B2 * | 7/2017 | Park | H02M 7/483 |

(Continued)

FOREIGN PATENT DOCUMENTS

| CN | 201805350 U | * | 4/2011 | ............ H02M 7/003 |
| EP | 2293407 A1 | * | 3/2011 | ................ H02J 1/06 |

(Continued)

OTHER PUBLICATIONS

CN201805350 English Translation. (Year: 2011).*
Search Report issued in PCT/EP2020/052812, dated Jun. 3, 2020, 1page.

*Primary Examiner* — Thienvu V Tran
*Assistant Examiner* — Nusrat Quddus
(74) *Attorney, Agent, or Firm* — Eversheds Sutherland (US) LLP

(57) ABSTRACT

An electrical assembly comprises a plurality of modules (36), each module (36) including at least one switching element (38) and at least one energy storage device (40), the or each switching element (38) and the or each energy storage device (40) in each module (36) arranged to be combinable to selectively provide a voltage source, wherein each module (36) includes a respective sensor (46) that is configured to monitor at least one other of the plurality of modules (36), each sensor (46) configured to selectively detect an occurrence of an operational hazard in the or each corresponding monitored module (36).

15 Claims, 3 Drawing Sheets

(51) Int. Cl.
*H02H 7/10* (2006.01)
*H02J 3/36* (2006.01)
*H02M 7/00* (2006.01)
*H02M 7/483* (2007.01)
*H02M 7/5387* (2007.01)

(52) U.S. Cl.
CPC ......... *H02M 7/003* (2013.01); *H02M 7/4835* (2021.05); *H02M 7/5387* (2013.01)

(58) Field of Classification Search
CPC .. H02M 5/4585; H02M 5/4505; H02M 5/451; H02M 5/452; H02M 5/447; H02M 5/456; H02M 1/12; H02M 1/4266; H02M 2001/123; H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02H 7/261; H02H 7/268; H02J 3/36; H02J 3/01

See application file for complete search history.

(56) References Cited

U.S. PATENT DOCUMENTS

| | | | | |
|---|---|---|---|---|
| 11,368,104 | B2* | 6/2022 | Fehmel | H02M 7/483 |
| 2012/0057308 | A1* | 3/2012 | Sihler | H02M 7/4835 |
| | | | | 206/320 |
| 2013/0026841 | A1 | 1/2013 | Hosini et al. | |
| 2014/0313797 | A1* | 10/2014 | Davidson | H02M 7/49 |
| | | | | 363/123 |
| 2015/0009594 | A1* | 1/2015 | Okaeme | H02M 7/4835 |
| | | | | 361/42 |
| 2020/0153225 | A1* | 5/2020 | Kralik | G01P 15/0891 |

FOREIGN PATENT DOCUMENTS

| | | | | |
|---|---|---|---|---|
| GB | 2547253 A | * | 8/2017 | ............... H02J 3/36 |
| WO | WO-2012143037 A2 | * | 10/2012 | ........... H02H 7/1255 |

* cited by examiner

ELECTRICAL ASSEMBLY FOR POWER TRANSMISSION AND COMPENSATION

CROSS-REFERENCE TO RELATED APPLICATIONS

This application is a U.S. National Stage Application under 35 U.S.C. 371 and claims the priority benefit of International Application No. PCT/EP2020052812, filed Feb. 5, 2020, which claims priority to European Application No. 19156698.3, filed Feb. 12, 2019, both of which are incorporated herein by reference.

This invention relates to an electrical assembly comprising a plurality of modules, each module including at least one switching element and at least one energy storage device, the or each switching element and the or each energy storage device in each module arranged to be combinable to selectively provide a voltage source, and a method for monitoring such an electrical assembly, preferably for use in medium voltage and high voltage power applications. In particular, the invention may relate to a converter, preferably for DC power transmission and/or reactive power compensation at high voltage or medium voltage.

In power transmission and distribution applications, it is known to use electrical devices based on so-called chain-link modules, each of which is configured to selectively provide a voltage source, to facilitate a range of electrical functions, such as power conversion or circuit interruption.

According to a first aspect of the invention, there is provided an electrical assembly comprising a plurality of modules, each module including at least one switching element and at least one energy storage device, the or each switching element and the or each energy storage device in each module arranged to be combinable to selectively provide a voltage source, wherein each module includes a respective sensor that is configured to monitor at least one other of the plurality of modules, each sensor configured to selectively detect an occurrence of an operational hazard in the or each corresponding monitored module.

The configuration of the plurality of modules may vary at the module level. In an example, one or more of the plurality of modules may be in the form of a half-bridge module that includes a pair of switching elements connected in parallel with an energy storage device in a half-bridge arrangement to define a 2-quadrant unipolar module that can provide zero or positive voltage and can conduct current in both directions. In another example, one or more of the plurality of modules may be in the form of a full-bridge module that includes two pairs of switching elements connected in parallel with an energy storage device in a full-bridge arrangement to define a 4-quadrant bipolar module that can provide negative, zero or positive voltage and can conduct current in both directions.

Furthermore, some or all of the plurality of modules may be electrically connected in series to define a chain-link converter, but also may be electrically connected to each other in other ways to define various circuit topologies.

There are a variety of ways in which each sensor can be included in the corresponding module. Each sensor may be integrated, installed or built into the structure of the corresponding module, e.g. the housing or other structural feature of the corresponding module.

For the purposes of this specification, an operational hazard is intended to refer to a danger or risk that has, or leads to, a detrimental effect on the operation of the module. Examples of an operational hazard include, but are not limited to, fire and arcing. Examples of detrimental effects include, but are not limited to, physical or electrical damage to one or more components of the module, diminished functionality of one or more components of the module, and a reduction in rating of one or more components of the module.

Each sensor may be configured to detect an occurrence of an operational hazard by sensing one or more characteristics or events associated with the occurrence of the operational hazard.

The inclusion of a respective sensor in each module to monitor at least one other of the plurality of modules provides improved sensor coverage in comparison to the use of external sensors that rely on line-of-sight to detect operational hazards (e.g. cameras, ultra-violet radiation detectors, infra-red radiation detectors, etc.). This is because the plurality of modules may be arranged so that one or more of the plurality of modules cannot be easily viewed by the line-of-sight sensors that are external to the electrical assembly. This is especially true when the plurality of modules is arranged in a long, straight line.

The configuration of the respective sensor of each module to monitor at least one other of the plurality of modules improves the reliability in detecting an operational hazard in the electrical assembly by avoiding the problems associated with configuring each sensor to only monitor the module in which it is included. More specifically, when each sensor is configured to only monitor the module in which it is included, a failure of a single sensor could not only result in failure to detect the operational hazard but also result in false positive detection of the operational hazard that might result in disruption of the normal operation of the electrical assembly due to, for example, premature triggering of a protective function of the electrical assembly. Moreover, when a given sensor is configured to only monitor the module in which it is included, the sensor is exposed to the operational hazard occurring in the monitored module, thus increasing the risk of failure of the sensor and thereby reducing the reliability in detecting an operational hazard in the electrical assembly. Whilst it may be possible to customise each sensor to improve its reliability in only monitoring the module in which it is included and at the same time avoid the aforementioned problems, this would lead to a more complex sensor design and therefore a more expensive scheme for detecting an occurrence of an operational hazard in the modules of the electrical assembly.

In addition, the configuration of the respective sensor of each module to monitor at least one other of the plurality of modules permits the configuration of the electrical assembly of the invention to provide a reliable and sensitive operational hazard detection system with inbuilt redundancy. For example, at least one of the plurality of sensors may be configured to monitor two or more other of the plurality of modules, and/or at least one of the plurality of modules may be monitored by two or more of the plurality of sensors. This not only provides redundancy in the monitoring of each module, but also can be used to reduce the likelihood of false positive detection by requiring multiple detections in order for an operational hazard to be deemed as having occurred. This in turn reduces the reliability requirements of each sensor and thereby paves the way to use relatively inexpensive off-the-shelf sensors.

The electrical assembly of the invention may further include a controller that is configured to be in communication with the plurality of sensors, wherein the controller is configured to trigger a protective function of the electrical assembly in response to a detection of an occurrence of an operational hazard in at least one of the plurality of modules.

The controller may be in the form of a global controller configured to communicate with each one of the plurality of sensors. The controller may be configured to be in communication with one or more of the plurality of sensors through a direct communications link, and/or in communication with one or more of the plurality of sensors through an indirect communications link.

For the purposes of this specification, a protective function of the electrical assembly is intended to refer to an operation of the electrical assembly that eliminates, limits or prevents the detrimental effect on the affected module(s).

Examples of protective functions of the electrical assembly include, but are not limited to, deactivation of one or more of the plurality of modules, and an alarm notification. Examples of deactivation of one or more of the plurality of modules include, but are not limited to, tripping the electrical assembly through use of a circuit interruption device, electrical bypass of the one or more modules, and electrical isolation of the one or more modules. Examples of alarm notifications include, but are not limited to, an audio alarm, a visual alarm, and an electronic alert sent to a remote unit such as a computer and handheld device.

In such embodiments employing the controller, the controller may be configured to trigger a protective function of the electrical assembly only in response to multiple detections of an occurrence of an operational hazard in at least one of the plurality of modules.

Configuration of the controller in this manner reduces the risk of a false positive detection triggering the protective function that would disrupt the normal operation of the electrical assembly.

In further such embodiments employing the controller, the controller may be configured to trigger a first protective function of the electrical assembly in response to a first number of detections of an occurrence of an operational hazard in at least one of the plurality of modules, the first protective function being an alarm notification, and wherein the controller may be configured to trigger a second protective function of the electrical assembly in response to a second number of detections of an occurrence of an operational hazard in at least one of the plurality of modules, the second protection function being a deactivation of one or more of the plurality of modules, the second number being higher than the first number.

Configuring the controller in this manner enables the electrical assembly to provide an advance warning of an operational hazard occurring in at least one of the plurality of modules upon reaching the first number of detections before automatically deactivating the affected module(s) upon reaching the higher second number of detections. This allows the electrical assembly to minimise a false positive detection (or false positive detections) causing unnecessary disruption of the normal operation of the electrical assembly and at the same time alert an operator to the possible occurrence of the operational hazard.

In embodiments of the invention, the controller may be configured to trigger a protective function of the electrical assembly in response to a detection of an occurrence of an operational hazard in at least one of the plurality of modules in combination with a detection of the occurrence of the same operational hazard by one or more sensors external to the modules. This results in a coordinated operational hazard detection system that can be configured to detect a wider range of operational hazards.

Each sensor may be configured to monitor at least one module that is arranged to be opposite, adjacent or next to the module in which it is included. Furthermore, each sensor may be configured to monitor at least one module that is in line of sight of the module in which it is included.

In further embodiments of the invention, the plurality of modules may include a first group of modules and a second group of modules, the first group of modules and the second group of modules arranged to face each other, the sensor of each module of the first group of modules configured to monitor at least one of the modules of the second group of modules, the sensor of each module of the second group of modules configured to monitor at least one of the modules of the first group of modules.

In still further embodiments of the invention, the electrical assembly may include a reflective surface, e.g. a mirror, that is arranged so that the sensor of at least one of the plurality of modules is configured to monitor the or each corresponding monitored module through a reflection of the or each corresponding monitored module. This is particularly useful for monitoring any module that cannot be viewed by any module sensor relying on line-of-sight.

Each sensor may include an infra-red radiation detector, a fire sensor, an ultra-violet radiation detector, and/or an arcing sensor. The fire sensor may be, for example, an infra-red radiation detector. The arc sensor may be, for example, an ultra-violet radiation detector, or a near field arcing sensor.

Each module may include multiple sensors of the same type, multiple sensors of different types, and/or one or more hybrid sensors configured to detect different operational hazards.

In embodiments of the invention employing sensors in the form of near field arc sensors, the controller may be configured to trigger a protective function of the electrical assembly only in response to multiple detections of an occurrence of arcing in at least one of the plurality of modules. This not only reduces the likelihood of false positive detections by requiring multiple near field arc sensors to detect the same operational hazard but also makes it easier to pinpoint the exact module in which the operational hazard is occurring.

Optionally each module may be configured to communicate with at least one other of the plurality of modules so that the switching of switching components of the modules in communication are synchronised to minimise or eliminate interference with the detection of the operational hazard.

Each module may be configured to be in communication with one or more other modules through a direct communications link, and/or in communication with one or more other modules through an indirect communications link. Each module may be configured to be in communication with one or more other modules through a global communications system.

The ability to synchronise the switching of switching components of the modules provides a quiet electrical environment that is conducive to the detection of the occurrence of the operational hazard.

Further optionally each module may include a switching detector, e.g. a radio receiver, configured to detect switching of at least one switching component of at least one other of the plurality of modules, each module configured to synchronise the switching of its switching component or components with the detected switching of the switching component or components of the or each other module to minimise or eliminate interference with the detection of the operational hazard. This configuration is particularly useful when communication between the modules is not available due to a communications fault or by design.

The invention is applicable to a wide range of electrical apparatus and devices that require the use of a plurality of modules, each module including at least one switching element and at least one energy storage device, the or each switching element and the or each energy storage device in each module arranged to be combinable to selectively provide a voltage source. For example, the electrical assembly may be a converter or circuit interruption device, such as a hybrid DC circuit breaker. In particular, the electrical assembly may be a converter for DC power transmission and/or reactive power compensation at high voltage or medium voltage.

According to a second aspect of the invention, there is provided a method of monitoring an electrical assembly comprising a plurality of modules, each module including at least one switching element and at least one energy storage device, the or each switching element and the or each energy storage device in each module arranged to be combinable to selectively provide a voltage source, the method comprising the steps of:
providing each module with a respective sensor;
using the respective sensor in each module to monitor at least one other of the plurality of modules; and
using each sensor to selectively detect an occurrence of an operational hazard in the or each corresponding monitored module.

The features and advantages of the electrical assembly of the first aspect of the invention and its embodiments apply mutatis mutandis to the method of the second aspect of the invention and its embodiments.

In the method of the invention, at least one of the plurality of sensors may be used to monitor two or more other of the plurality of modules, and/or at least one of the plurality of modules may be monitored by two or more of the plurality of sensors.

The method of the invention may include the step of triggering a protective function of the electrical assembly in response to a detection of an occurrence of an operational hazard in at least one of the plurality of modules.

In such embodiments, the method of the invention may include the step of triggering a protective function of the electrical assembly only in response to multiple detections of an occurrence of an operational hazard in at least one of the plurality of modules.

In further such embodiments, the method of the invention may include the steps of:
triggering a first protective function of the electrical assembly in response to a first number of detections of an occurrence of an operational hazard in at least one of the plurality of modules, the first protective function being an alarm notification; and
triggering a second protective function of the electrical assembly in response to a second number of detections of an occurrence of an operational hazard in at least one of the plurality of modules, the second protection function being a deactivation of one or more of the plurality of modules, the second number being higher than the first number.

In still further such embodiments, the method of the invention may include the step of triggering a protective function of the electrical assembly in response to a detection of an occurrence of an operational hazard in at least one of the plurality of modules in combination with a detection of the occurrence of the same operational hazard by one or more sensors external to the modules.

In the method of the invention, the plurality of modules may include a first group of modules and a second group of modules, the first group of modules and the second group of modules arranged to face each other, and the method may include the steps of:
using the sensor of each module of the first group of modules to monitor at least one of the modules of the second group of modules; and
using the sensor of each module of the second group of modules to monitor at least one of the modules of the first group of modules.

In the method of the invention, the electrical assembly may include a reflective surface, and the method may include the step of using the sensor of at least one of the plurality of modules to monitor the or each corresponding monitored module through a reflection of the or each corresponding monitored module from the reflective surface.

In the method of the invention, each sensor may include an infra-red radiation detector, a fire sensor, an ultra-violet radiation detector, and/or an arcing sensor.

In the method of the invention, each sensor may include a near field arcing sensor.

The method of the invention may include the step of triggering a protective function of the electrical assembly only in response to multiple detections of an occurrence of arcing in at least one of the plurality of modules.

The method of the invention may include the step of synchronising the switching of switching components of the modules to minimise or eliminate interference with the detection of the operational hazard.

The method of the invention may include the step of configuring each module to communicate with at least one other of the plurality of modules so that the switching of switching components of the modules in communication are synchronised to minimise or eliminate interference with the detection of the operational hazard.

The method of the invention may include the steps of:
providing each module with a respective switching detector;
using the respective switching detector of each module to detect switching of at least one switching component of at least one other of the plurality of modules; and
configuring each module to synchronise the switching of its switching component or components with the detected switching of the switching component or components of the or each other module to minimise or eliminate interference with the detection of the operational hazard.

In the method of the invention, the electrical assembly may be a converter or circuit interruption device, preferably wherein the electrical assembly is a converter for DC power transmission and/or reactive power compensation at high voltage or medium voltage.

It will be appreciated that the use of the terms "first" and "second", and the like, in this patent specification is merely intended to help distinguish between similar features (e.g. the first and second group of modules), and is not intended to indicate the relative importance of one feature over another feature, unless otherwise specified.

A preferred embodiment of the invention will now be described, by way of a non-limiting example, with reference to the accompanying drawings in which.

The figures are not necessarily to scale, and certain features and certain views of the figures may be shown exaggerated in scale or in schematic form in the interests of clarity and conciseness.

The following embodiment of the invention is used primarily in high voltage direct current (HVDC) applications, but it will be appreciated that the following embodiment of the invention is applicable mutatis mutandis to other applications operating at different voltage levels, such as medium voltage levels. It will be further appreciated that the following embodiment of the invention is described with reference to a converter for DC power transmission and/or reactive power compensation, but is applicable mutatis mutandis to other types of electrical devices, such as hybrid DC circuit breakers.

Figure 1:
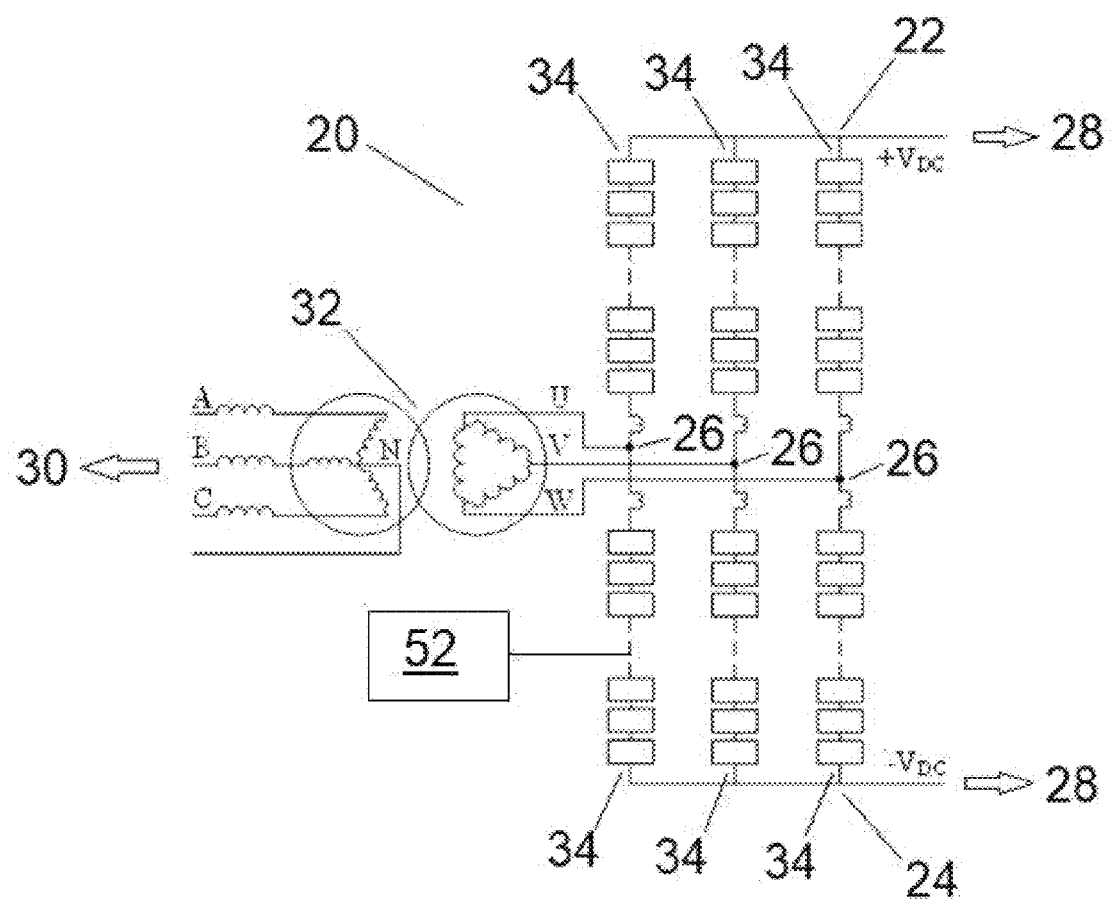
FIG. 1 shows a voltage source converter according to an embodiment of the invention.

A voltage source converter according to an embodiment of the invention is shown in FIG. 1 and is designated generally by the reference numeral 20.

The voltage source converter 20 includes first and second DC terminals 22,24 and a plurality of converter limbs. Each converter limb extends between the first and second DC terminals 22,24 and includes first and second limb portions separated by a respective AC terminal 26. In each converter limb, the first limb portion extends between the first DC terminal 22 and the AC terminal 26, while the second limb portion extends between the second DC terminal 24 and the AC terminal 26.

In use, the first and second DC terminals 22,24 of the voltage source converter 20 are connected to a DC network 28, and the AC terminal 26 of each converter limb of the voltage source converter 20 is connected to a respective AC phase of a three-phase AC network 30 via a transformer arrangement 32.

Each limb portion includes a switching valve 34 in the form of a chain-link converter that is defined by a plurality of series-connected modules 36. Each module 36 includes a plurality of switching elements 38 and at least one capacitor 40, the plurality of switching elements 38 and the or each capacitor 40 in each such module 36 being arranged to be combinable to selectively provide a voltage source. Each switching valve 34 may include up to several hundred modules.

Figure 2:
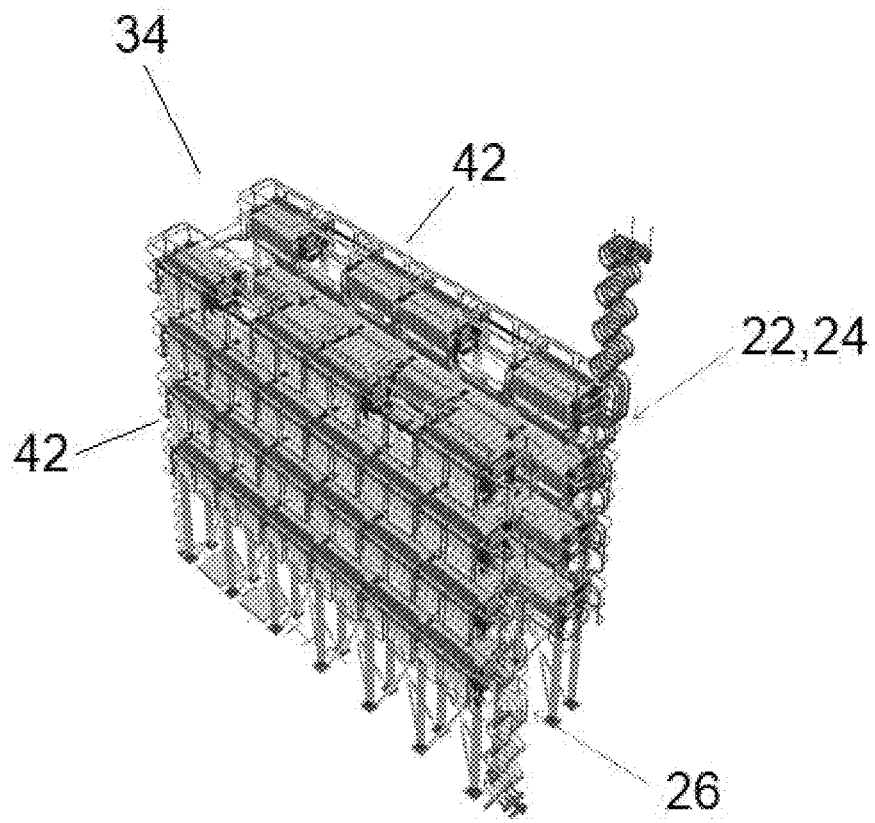
FIG. 2 shows a switching valve of the voltage source converter of FIG. 1.

FIG. 2 shows a perspective view of the switching valve 34. The switching valve 34 includes two module containment tower structures 42, each of which resembles a rectangular box. The module containment tower structures 42 are arranged side by side so that their longer sides face each other. Each module containment tower structure 42 houses multiple rows of modules 36, with each row extending along the longer sides of the corresponding module containment structure and with the multiple rows of modules 36 being stacked on top of each other. The power electronics of each module 36 is preferably located outside the corresponding module containment tower structure 42 in order to facilitate maintenance.

Figure 3:
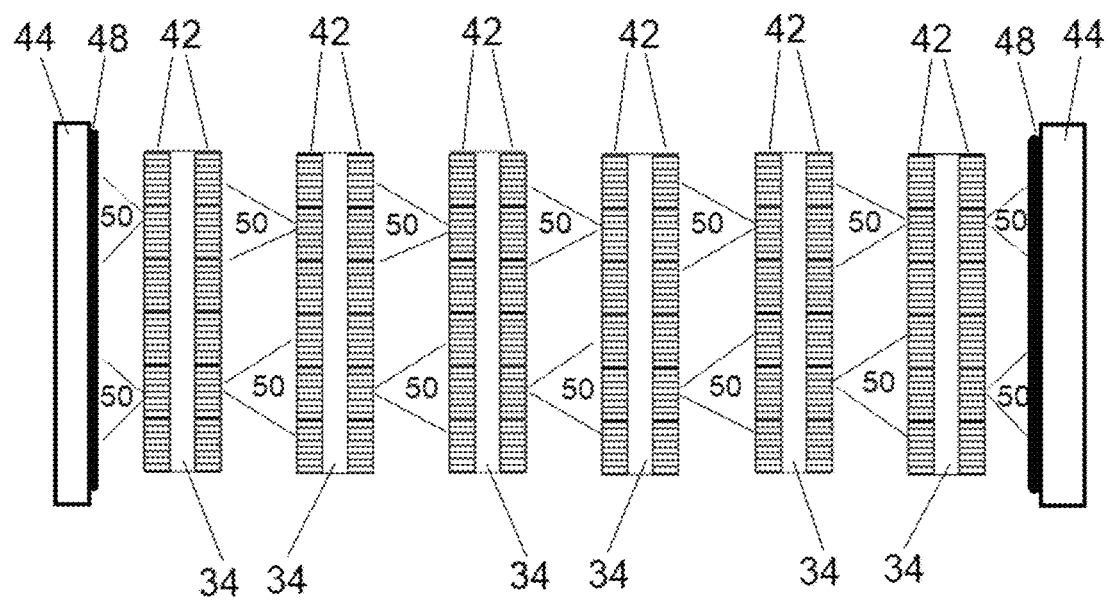
FIG. 3 shows a top view of an arrangement of switching valves of the voltage source converter of FIG. 1.

FIG. 3 shows a top view of the six switching valves 34 of the voltage source converter. The six switching valves 34 are arranged in a row so that there are two outer switching valves 34 arranged at both ends of the row, and four inner switching valves 34 arranged between the two outer switching valves 34. For the two outer switching valves 34, one longer side faces the longer side of a neighbouring switching valve 34 while the other longer side faces a wall 44. For the four inner switching valves 34, one longer side faces the longer side of a neighbouring switching valve 34 while the other longer side faces the longer side of another neighbouring switching valve 34.

Each module 36 may vary in topology, examples of which are described as follows.

Figure 4:
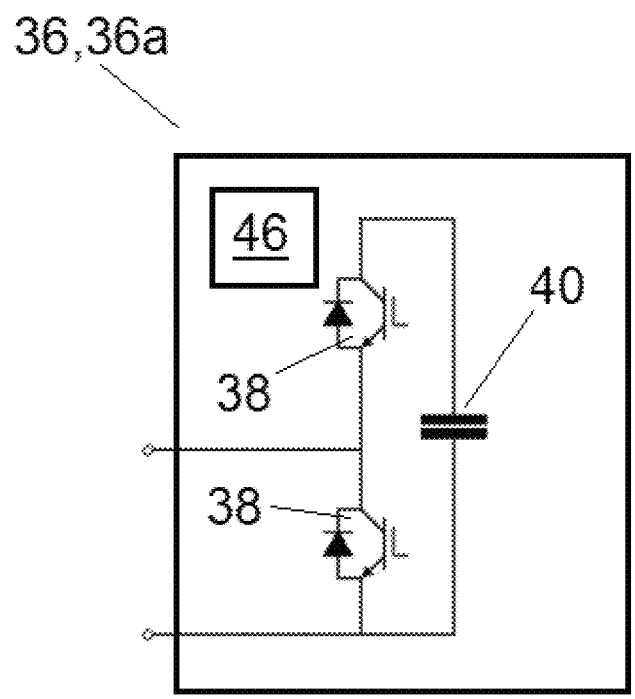
FIG. 4 shows a half-bridge module for use in the switching valves of FIGS. 2 and 3.

FIG. 4 shows schematically the structure of an exemplary module 36 in the form of a half-bridge module 36a. The half-bridge module 36a includes a pair of switching elements 38 and a capacitor 40. The pair of switching elements 38 are connected in parallel with the capacitor 40 in a half-bridge arrangement to define a 2-quadrant unipolar module 36a that can provide zero or positive voltage and can conduct current in both directions.

Figure 5:
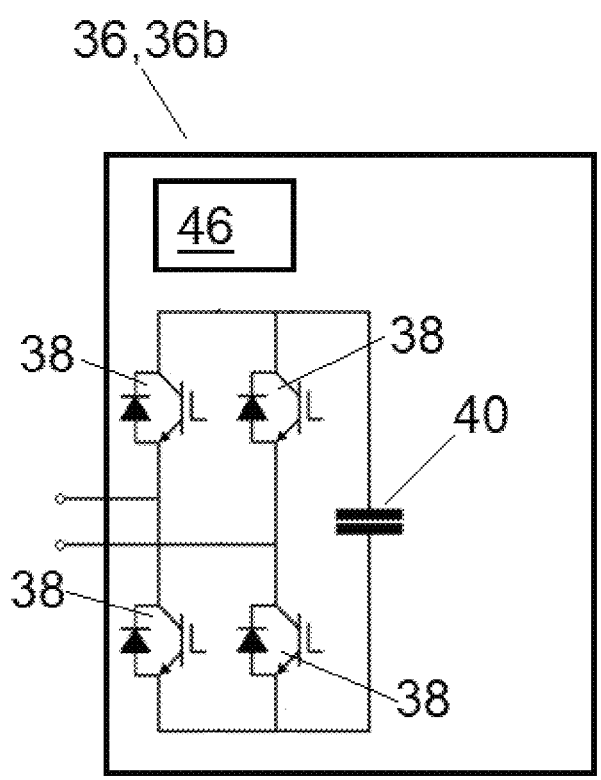
FIG. 5 shows a full-bridge module for use in the switching valves of FIGS. 2 and 3.

FIG. 5 shows schematically the structure of an exemplary module 36 in the form of a full-bridge module 36b. The full-bridge module 36b includes two pairs of switching elements 38 and a capacitor 40. The pairs of switching elements 38 are connected in parallel with the capacitor 40 in a full-bridge arrangement to define a 4-quadrant bipolar module 36b that can provide negative, zero or positive voltage and can conduct current in both directions.

Each switching element 38 is in the form of an insulated gate bipolar transistor (IGBT) which is connected in parallel with an anti-parallel diode. It is envisaged that, in other embodiments of the invention, each IGBT may be replaced by a gate turn-off thyristor, a field effect transistor, an injection-enhanced gate transistor, an integrated gate commutated thyristor or any other self-commutated semiconductor device. It is also envisaged that, in other embodiments of the invention, each IGBT may be replaced by a plurality of series-connected IGBTs, and/or each diode may be replaced by a plurality of series-connected diodes.

It is further envisaged that, in still other embodiments of the invention, each capacitor 40 may be replaced by a different type of energy storage device capable of releasing and storing energy to selectively provide a voltage, such as a battery or fuel cell.

The capacitor 40 of each module 36 is selectively bypassed or inserted into the corresponding chain-link converter by changing the states of the switching elements 38. This selectively directs current through the capacitor 40 or causes current to bypass the capacitor 40, so that the module 36 provides a zero or positive voltage in the case of the half-bridge module 26a, and a negative, zero or positive voltage in the case of the full-bridge module 36b.

It is possible to build up a combined voltage across each chain-link converter, which is higher than the voltage available from each of its individual modules 36, via the insertion of the capacitors 40 of multiple modules 36, each providing its own voltage, into each chain-link converter. In this manner switching of the switching elements 38 in each module 36 causes each chain-link converter to provide a stepped variable voltage source, which permits the generation of a voltage waveform across each chain-link converter using a step-wise approximation. Hence, the switching elements 38 in each switching valve 34 are switchable to selectively permit and inhibit flow of current through the corresponding capacitor 40 in order to control a voltage across the corresponding limb portion. This in turn permits the use of the voltage source converter 30 to transfer power between the DC and AC networks 28,30 through switching of the switching elements 38 of the modules 36 to provide a stepped variable voltage source and thereby generate a voltage waveform so as to control the configuration of an AC voltage waveform at the corresponding AC terminal 26 to facilitate the transfer of power between the DC and AC networks 28,30.

During the operation of the voltage source converter 20, a fire may occur in one or more modules 36 of the voltage source converter 20. Due to the gap between neighbouring switching valves 34 being considerably smaller than the length of the longer sides of the switching valves 34, it may be difficult to detect the occurrence of a fire in any module 36 that is visually hidden from line-of-sight sensors that are external to the voltage source converter 20.

In order to achieve reliable detection of any fire occurrence in the modules 36, the voltage source converter 20 includes a fire detection system that is configured as follows.

Each module includes a respective sensor 46 that is in the form of an infra-red radiation detector.

In each inner switching valve 34, each sensor 46 faces outwards of the corresponding module containment tower structure 42 so as to face multiple modules 36 of a neighbouring inner switching valve 34. In the module containment tower structures 42 of the outer switching valves 34 facing the inner switching valves 34, each sensor 46 faces outwards of the corresponding module containment tower structure 42 so as to face multiple modules 36 of a neighbouring inner switching valve 34. In the module containment tower structures 42 of the outer switching valves 34 facing the walls 44, a mirror 48 is arranged on each wall 44 so that each sensor 46 faces the reflection of multiple modules 36 of the same module containment tower structure 42. FIG. 3 illustrates the sensor coverages 50 of some of the sensors 46 in each switching valve 34.

In this way, each sensor 46 of each switching valve 34 is able to monitor for a fire occurrence in multiple other modules 36, and each module 36 is monitored by multiple sensors 46.

Alternatively, for the module containment tower structures 42 of the outer switching valves 34 facing the inner switching valves 34, additional infra-red radiation sensors (not shown) may be mounted on the walls 44 so that the additional infra-red radiation sensors face the modules 36 of the outer switching valves 34. In this way, a fire occurrence in the modules 36 of the outer switching valves 34 can be detected through use of the additional infra-red radiation sensors.

The voltage source converter 20 further includes a controller 52 that is configured to be in communication with the plurality of sensors 46. Upon detection of infra-red radiation exceeding a certain level that corresponds to a fire occurrence, each sensor 46 transmits an electrical signal signifying the fire occurrence to the controller 52. Upon receipt of the electrical signal, the controller 52 triggers a protective function of the voltage source converter 20, such as issuing an alarm notification or tripping the voltage source converter 20.

To reduce the risk of a false positive detection, the controller 52 is preferably configured to trigger the protective function only in response to multiple sensors 46 detecting the fire occurring in the affected module 36. Further preferably, the controller 52 is configured to provide an advance warning of the fire occurring in the affected module 36 before automatically deactivating the affected module 36. This is achieved by configuring the controller 52 to first issue an alarm notification upon receiving signals from the sensors 46 corresponding to a first number of detections of the fire in the affected module 36 (e.g. 2-3 detections) and then tripping the voltage source converter 20 in response to a higher second number of detections of the fire in the affected module 36 (e.g. 4 or more detections).

Optionally the controller 52 may be configured to trigger a protective function of the voltage source converter 20 in response to a detection of a fire occurrence in the affected module 36 in combination with a detection of the same fire occurrence by one or more sensors 46 external to the modules 36.

The inclusion of the respective sensor 46 in each module 36 to monitor multiple other modules 36 not only enables the reliable monitoring of all of the modules 36 irrespective of the lengths of the longer sides of the switching valves 34, but also improves the reliability in detecting a fire occurrence in the voltage source converter 20 by avoiding the earlier-mentioned problems associated with configuring each sensor 46 to only monitor the module 36 in which it is included. In addition, the configuration of the respective sensor 46 of each module 36 to monitor multiple other modules 36 results in a reliable and sensitive fire detection system with inbuilt redundancy. This not only provides redundancy in the monitoring of each module 36, but also can be used to reduce the likelihood of false positive detection by requiring multiple detections in order for a fire to be deemed as having occurred. This in turn enables the use of simpler and less expensive off-the-shelf sensors 46.

The switching valves may be arranged in different ways from the embodiment shown in FIGS. 2 and 3.

In one example, a switching valve may include a plurality of module containment tower structures, e.g. 4-6 in number, that are arranged in a line. Each module containment tower structure may have a square aspect ratio. In such a switching valve, each module containment tower structure may house a respective plurality of modules, and electrical connections may be formed between the module containment tower structures to define a series connection of the modules of the module containment tower structures. A plurality of such switching valves may be arranged in a row so that there are two outer switching valves arranged at both ends of the row, and one or more inner switching valves arranged between the two outer switching valves. In this manner, the sensor of each module may be configured to monitor a plurality of other modules, in particular one or more modules in the adjacent module containment tower structure(s) of the same switching valve and/or one or more modules in at least one module containment tower structure of the adjacent switching valve(s). Regarding the latter, it is preferable that the sensor of each module may be configured to monitor one or more modules in the closest module containment tower structure(s) of the adjacent switching valve(s).

It will be appreciated that, in other embodiments of the invention, the sensors 46 of the above embodiment may be configured to detect other types of operational hazards in the modules 36.

In one such example, each sensor 46 may be in the form of a near field arc sensor 46, instead of an infra-red radiation detector. Arcing in a switching valve 34 is a fire hazard. Hence, it is important to pinpoint the module 36 in which the arc is occurring in order to enable its removal. It will be appreciated that ultra-violet radiation detectors may be used for sensing the occurrence of arcing in the modules 36.

Each near field arc sensor 46 is configured as a radio-frequency inductive loop sensor 46 to detect arcing that has a frequency of ~50 MHz. Each near field arc sensor 46 is typically sensitive to arcs within a range of a few metres. This not only enables each near field arc sensor 46 to detect an arc occurrence in its own module 36 and adjacent submodules 36, but also allows the identification of the source of the arc to be localised to a small area.

In the event of an arc occurring in a module 36, the arc would be detected by the near field arc sensor 46 of the same module 36 and also the near field arc sensors 46 of other nearby modules 36. The use of multiple near field arc sensors 46 to detect the same arc occurrence makes it easier to pinpoint the exact module 36 in which the arc is occurring. Also, the risk of a false positive detection can be reduced by configuring the controller 52 to trigger a protective function of the voltage source converter 20 only in response to multiple detections of an arc occurrence in the affected module 36.

Optionally the controller 52 may be configured to trigger a protective function of the voltage source converter 20 in response to a detection of an arc occurrence in the affected module 36 in combination with a detection of the same arc occurrence by one or more sensors 46 external to the modules 36.

A possible source of interference with the detection of the arc occurrence by the near field arc sensors 46 is switching noise from (a) high voltage power supply units (switching regulators) on adjacent modules 36 and (b) switching of the switching elements 38 of the modules 36. Hence, it is desirable to remove the source of interference in order to provide a quiet electrical environment that is conducive to the detection of the arc occurrence.

The interference arising from the switching noise may be mitigated through communication between the modules 36 in order to enable the configuration of the modules 36 to achieve synchrony between the switching operations of the switching regulators' oscillators and/or the switching of the switching elements 38 of the modules 36. When communication between modules 36 is not available, a radio receiver (not shown) in each module 36 may be used to detect the switching operations of the switching regulators of the adjacent modules 36 in order to enable the configuration of the modules 36 to achieve synchrony between the switching operations of the switching regulators' oscillators.

The invention claimed is:

1. An electrical assembly comprising a plurality of modules arranged in one or more containment tower structures, each module including at least one switching element and at least one energy storage device, each switching element and each energy storage device in each module arranged to be combinable to selectively provide a voltage source, wherein each module includes a respective sensor that is configured to monitor at least one other of the plurality of modules in either a same containment tower structure of the one or more containment tower structures as the respective module or a different containment tower structure of the one or more containment tower structures facing the same containment tower structure as the respective module, wherein the respective sensor monitoring the at least one other of the plurality of modules is based on a position of the at least one other of the plurality of modules with respect to a line of sight of the respective sensor, each sensor configured to selectively detect an occurrence of an operational hazard in the at least one other of the plurality of modules.

2. The electrical assembly according to claim 1 wherein at least one of the plurality of sensors is configured to monitor two or more other of the plurality of modules based on the arrangement of the modules in the one or more containment tower structures, and at least one of the plurality of modules is monitored by two or more of the plurality of sensors based on the arrangement of the modules in the one or more containment tower structures.

3. The electrical assembly according to claim 1 further including a controller that is configured to be in communication with the plurality of sensors, wherein the controller is configured to trigger a protective function of the electrical assembly in response to a detection of an occurrence of an operational hazard in at least one of the plurality of modules.

4. The electrical assembly according to claim 3 wherein the controller is configured to trigger a protective function of the electrical assembly only in response to multiple detections of an occurrence of an operational hazard in at least one of the plurality of modules.

5. The electrical assembly according to claim 3 wherein the controller is configured to trigger a first protective function of the electrical assembly in response to a first number of detections of an occurrence of an operational hazard in at least one of the plurality of modules, the first protective function being an alarm notification, and wherein the controller is configured to trigger a second protective function of the electrical assembly in response to a second number of detections of an occurrence of an operational hazard in at least one of the plurality of modules, the second protection function being a deactivation of one or more of the plurality of modules, the second number being higher than the first number.

6. The electrical assembly according to claim 3 wherein the controller is configured to trigger a protective function of the electrical assembly in response to a detection of an occurrence of an operational hazard in at least one of the plurality of modules in combination with a detection of the occurrence of the same operational hazard by one or more sensors external to the modules.

7. The electrical assembly according to claim 1 wherein the plurality of modules includes a first group of modules arranged in a first containment tower structure of the one or more containment tower structures and a second group of modules, arranged in a second containment tower structure of the one or more containment tower structures the first group of modules and the second group of modules arranged to face each other, the sensor of each module of the first group of modules configured to monitor at least one of the modules of the second group of modules, the sensor of each module of the second group of modules configured to monitor at least one of the modules of the first group of modules.

8. The electrical assembly according to claim 1 including a reflective surface that is arranged so that the sensor (46) of at least one of the plurality of modules is configured to monitor the at least one other of the plurality of modules through a reflection of the at least one other of the plurality of modules, wherein the at least one other of the plurality of modules is arranged not within the line of sight of the respective sensor.

9. The electrical assembly according to claim 1 wherein each sensor includes an infra-red radiation detector, a fire sensor, an ultra-violet radiation detector, and/or an arcing sensor.

10. The electrical assembly according to claim 1 wherein each sensor includes a near field arcing sensor.

11. The electrical assembly according to claim 3, wherein each sensor includes a near field arcing sensor and wherein the controller is configured to trigger a protective function of the electrical assembly only in response to multiple detections of an occurrence of arcing in at least one of the plurality of modules.

12. The electrical assembly according to claim 1 wherein each module is configured to communicate with at least one other of the plurality of modules so that the switching of switching components of the modules in communication are synchronized to minimize or eliminate interference with the detection of the operational hazard.

13. The electrical assembly according to claim 1 wherein each module includes a switching detector configured to detect switching of at least one switching component of at least one other of the plurality of modules, each module configured to synchronize the switching of its switching component or components with the detected switching of the switching component or components of the or each other module to minimize or eliminate interference with the detection of the operational hazard.

14. The electrical assembly according to claim 1 wherein the electrical assembly is a converter or circuit interruption device, preferably wherein the electrical assembly is a converter for DC power transmission and/or reactive power compensation at high voltage or medium voltage.

15. A method of monitoring an electrical assembly comprising a plurality of modules arranged in one or more containment tower structures, each module including at least one switching element and at least one energy storage device, each switching element and each energy storage device in each module arranged to be combinable to selectively provide a voltage source, the method comprising:

providing each module with a respective sensor;

using the respective sensor of each module to monitor at least one other of the plurality of modules in either a same containment tower structure of the one or more containment tower structures as the respective module or a different containment tower structure of the one or more containment tower structures facing the same containment tower structure as the respective module, wherein the respective sensor monitoring the at least one other of the plurality of modules is based on a position of the at least one other of the plurality of modules with respect to a line of sight of the respective sensor; and using each sensor to selectively detect an occurrence of an operational hazard in its respective module and at least one other of the plurality of modules.

* * * * *